United States Patent
Kawakita et al.

[11] Patent Number: 5,310,030
[45] Date of Patent: May 10, 1994

[54] ENERGY-ABSORBING FASTENED STRUCTURE

[75] Inventors: Tadashi Kawakita; Yukihisa Sugiyama, both of Kanagawa, Japan

[73] Assignee: Ikeda Bussan Co., Ltd., Ayase City, Japan

[21] Appl. No.: 871,999

[22] Filed: Apr. 22, 1992

[30] Foreign Application Priority Data

Apr. 25, 1991 [JP] Japan .............................. 3-038141[U]

[51] Int. Cl.$^5$ .............................................. F16F 7/12
[52] U.S. Cl. ................................... 188/371; 297/216.1
[58] Field of Search .................... 188/371, 374, 377; 297/216, 362; 280/777

[56] References Cited

U.S. PATENT DOCUMENTS

| | | | |
|---|---|---|---|
| 3,578,376 | 5/1971 | Hasegawa | 297/216 |
| 3,744,818 | 7/1973 | Sandberg | 280/752 |
| 3,762,505 | 10/1973 | Morse | 188/371 |
| 3,769,851 | 11/1973 | Edme et al. | 188/371 |
| 3,994,467 | 11/1976 | Pike | 248/548 |
| 4,218,853 | 8/1980 | Willoughby et al. | 188/371 |
| 4,703,669 | 11/1987 | Hyodo | 188/371 |
| 5,090,771 | 2/1992 | Kawakita | 297/362 |

FOREIGN PATENT DOCUMENTS

| | | |
|---|---|---|
| 0161121 | 11/1985 | European Pat. Off. . |
| 63-318911 | 12/1988 | Japan . |
| 1132188 | 10/1968 | United Kingdom . |
| 2160292 | 12/1985 | United Kingdom . |
| 2244032 | 11/1991 | United Kingdom . |

Primary Examiner—Robert J. Oberleitner
Assistant Examiner—Chris Schwartz
Attorney, Agent, or Firm—Foley & Lardner

[57] ABSTRACT

An energy-absorbing fastened structure includes first and second platelike members which are tightly fastened by a fastener having a shaft portion. The shaft portion is passed through first and second through holes which are mated with each other and respectively formed through the first and second members. The first member is formed with an energy-absorbing means for absorbing a heavy shock load which exceeds a predetermined magnitude and is applied to the fastened structure. The absorbing means is to be deformed by the shaft portion which is forced to move together with the second member relative to the first member. With this, damages to the second member is prevented or at least minimized.

6 Claims, 3 Drawing Sheets

ENERGY-ABSORBING FASTENED STRUCTURE

BACKGROUND OF THE INVENTION

1. Field of the Invention

The present invention relates to a so-called energy-absorbing fastened structure, and more particularly to an energy-absorbing fastened structure of a reclining device which is installed on an automotive seat, the fastened structure being capable of preventing or at least minimizing damages upon an accident to a lock mechanism of the reclining device.

2. Description of the Prior Art

Hitherto, various kinds of reclining devices have been proposed and put into practical use particularly in the field of automotive seats. As is known, the reclining device serves to adjust angular position of a seatback of an automotive seat and to lock the same at a certain desired angular position relative to a seat cushion thereof to provide a seat occupant with a comfortable sitting posture.

For example, JP-A (Patent) 63-318911 discloses a reclining device having therein a planetary gear arrangement. This type of reclining device installed on a motor vehicle seat can steplessly adjust angular position of a seatback thereof and lock the same at a certain desired angular position relative to a seat cushion thereof. The reclining device comprises first and second supporting plates which are respectively formed with ring gears meshed with a plurality of planetary gears, a control gear which is meshed with the planetary gears and coaxially mounted on a control shaft, an arm plate which is secured to the seatback, and a base plate which is secured to the seat cushion. The first and second supporting plates are respectively secured to the arm plate and the base plate through connecting pins. Thus, when the control shaft is rotated, the first supporting plate and the arm plate are slowly rotated about an axis of the control shaft so as to adjust the angular position of the seatback. When rotation of the control shaft is stopped, the seatback is locked at a certain desired angle.

When, for example, the motor vehicle is hard rear-ended by another vehicle, a seat occupant of the vehicle is abruptly rearwardly forced to move relative to the seat and struck at his or her back onto the seatback. Therefore, a heavy shock load is added to the seatback and the reclining device which supports the same. Therefore, the reclining device can be strongly built so as to support the load and thus to prevent or at least minimize damages to the same. However, this increases the production cost of the reclining device.

SUMMARY OF THE INVENTION

It is therefore a general object of the present invention to provide a reclining device which can support a heavy shock load and can be economically built.

It is another general object of the present invention to provide an energy-absorbing fastened structure for absorbing a shock load applied thereto.

It is a more specific object of the present invention to provide a reclining device which has an energy-absorbing fastened structure for absorbing a heavy shock load applied thereto, thereby preventing or at least minimizing damages to a lock mechanism of the reclining device.

According to the present invention, there is provided an energy-absorbing fastened structure including: a first member having a first through hole; a second member having a second through hole which is mated with the first through hole; a fastener for fastening the first and second members together, with putting a shaft portion of the fastener through the mated first and second through holes; and means for absorbing an energy of a load which exceeds a predetermined magnitude and is applied to the fastened structure, the absorbing means being formed on the first member and constructed so as to be deformed by the shaft portion of the fastener which is forced to move together with the second member relative to the first member.

DESCRIPTION OF THE PREFERRED EMBODIMENTS

Figure 1:
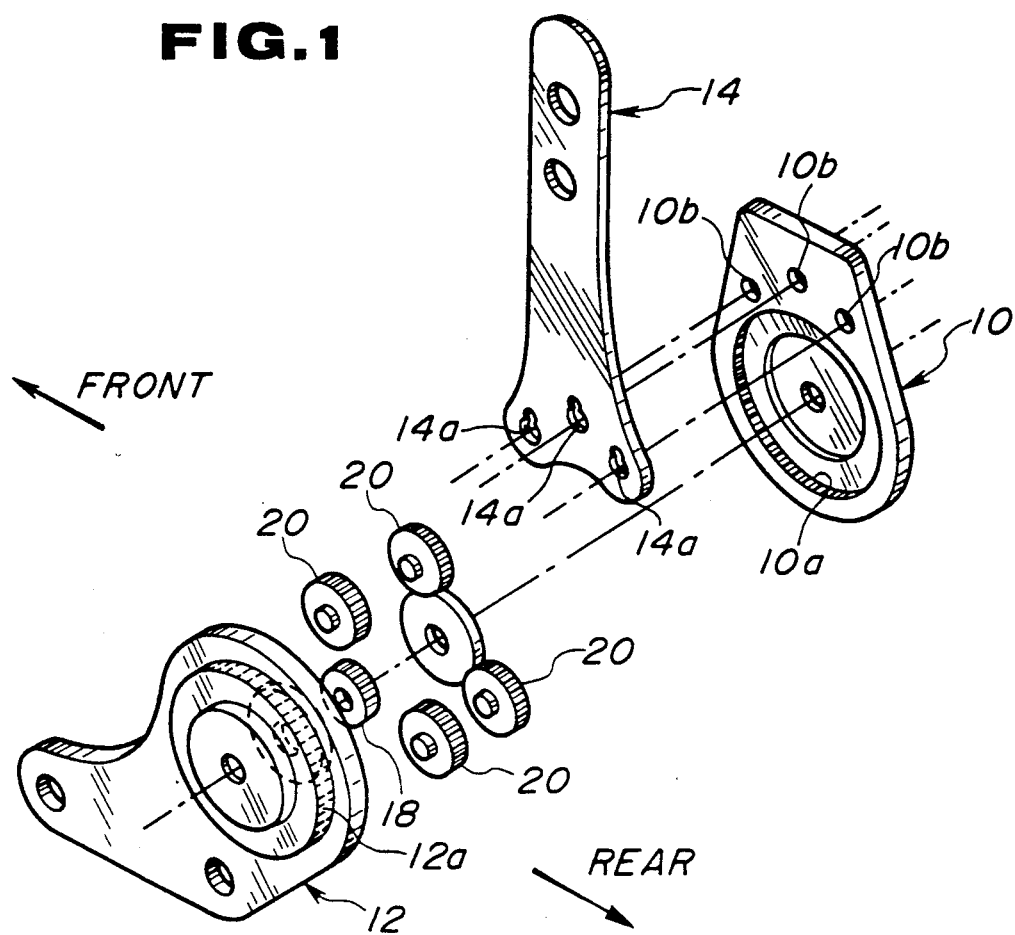
FIG. 1 is an exploded perspective view of a reclining device which has an energy-absorbing fastened structure according to a first embodiment of the present invention.
Figure 2:
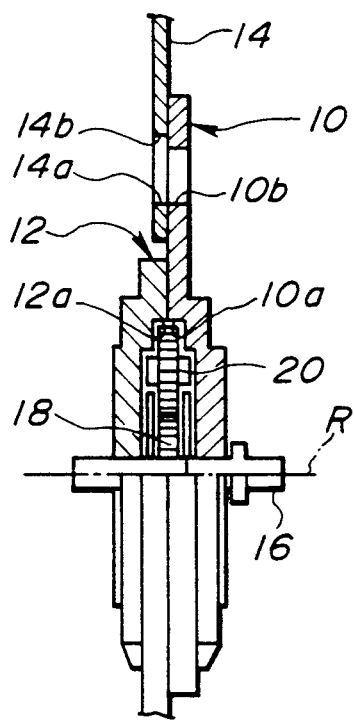
FIG. 2 is a rear elevational, but partially sectioned, view of the reclining device.

Referring to FIGS. 1 and 2, there is provided a reclining device which is to be installed on a motor vehicle seat (not shown), in accordance with a first embodiment of the present invention. The reclining device has a planetary gear arrangement which serves as a lock mechanism. The lock mechanism of the reclining device serves to adjust angular position of a seatback of the seat and to lock the seatback at a certain desired angular position relative to a seat cushion thereof to provide a seat occupant with a comfortable sitting posture.

The reclining device comprises first and second supporting plates 10 and 12, an arm plate 14, a control shaft 16, a control gear 18, and a plurality of planetary gears 20 (four gears in this embodiment). The arm plate 14 and the second supporting plate 12 are respectively secured to the seatback and the seat cushion. The first and second supporting plates 10 and 12 are respectively formed with ring gears 10a and 12a which are operatively meshed with the planetary gears 20. The planetary gears 20 are operatively meshed with the control gear 18 which is coaxially mounted on the control shaft 16 so as to be rotatable therewith. As will be clarified hereinafter, the arm plate is secured to the first supporting plate 10. Thus, the first supporting plate 10 and the arm plate 14 rotate slowly about a rotational axis "R" of the control shaft 16, by the rotation thereof, relative to the second supporting plate 12. Thus, the seatback pivots slowly in a forward or rearward direction relative to the seat cushion. When rotation of the control shaft 16 is stopped, the seatback is locked at a desired angular position.

The reclining device has a so-called energy-absorbing fastened structure, according to the first embodiment of the present invention, for absorbing a heavy shock load exceeding a predetermined magnitude applied to the reclining device, by deformation of the fastened structure, so as to prevent or at least minimize damages to the lock mechanism of the reclining device. This function of the fastened structure will be described in detail in the following.

Figure 3:
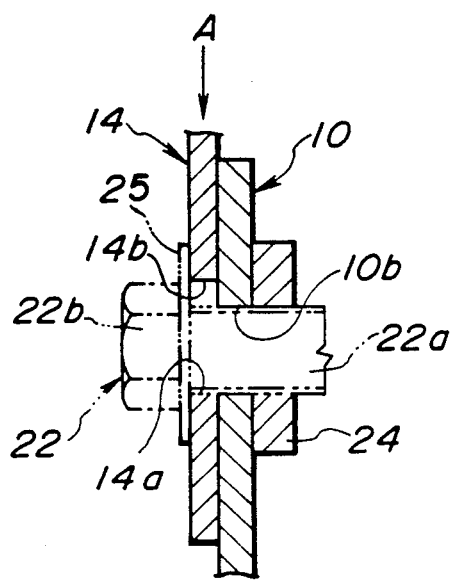
FIG. 3 is an enlarged, partial and sectional view showing an arm plate according to the first embodiment and a first supporting plate which are fastened together through bolts and nuts.

As is seen from FIG. 3, the energy-absorbing structure comprises the arm plate 14 and the first supporting plate 10 which are fastened together through bolts 22 (only one is shown) and nuts 24 (only one is shown).

As is seen from FIG. 2, each of the first and second supporting plates 10 and 12 is thicker and thus more strongly built than the arm plate 14 is.

As is seen from FIG. 1, the first supporting plate 10 has three through holes 10b each of which is circular in shape and so sized as to fitly receive therein a shaft portion 22a of the bolt 22 without producing play.

Figure 4:
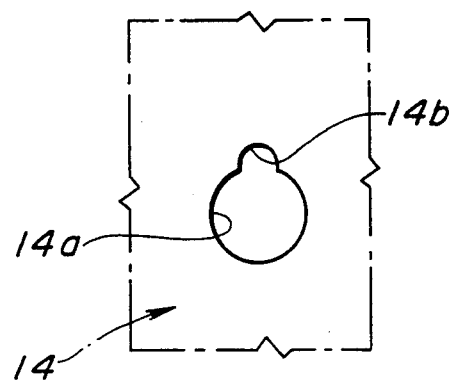
FIG. 4 is a partial and plan view of the arm plate according to the first embodiment of the present invention.

As is seen from FIGS. 1 and 4, the arm plate 14 is formed with three through holes each of which has a circular portion 14a and a semicircular portion 14b. The circular portion 14a is united with the semicircular portion 14b, and larger than the same in diameter. The circular portion 14a of the arm plate 14 is the same as the through hole 10b of the first supporting plate 10 in diameter.

As is seen from FIG. 3, the shaft portion 22a of the bolt 22 passes through the circular portion 14a of the arm plate 14 and the through hole 10b of the first supporting plate 10, and is screwed into the nut 24, thereby tightly fastening the arm plate 14 and the first supporting plate 10 together, without producing play therebetween. Thus, a head portion 22b of the bolt is in abutment with the arm plate 14 with an interposal of washer 25.

When the vehicle is hard rear-ended by another vehicle, the seat occupant is abruptly rearwardly forced to move relative to the seat and struck onto the seatback. Therefore, a heavy shock load is added to the seatback and the reclining device supporting the same. When, for example, the load is added to the reclining device in a downward direction which is shown by an arrow "A" in FIG. 3, the arm plate 14 is forced to move downwardly relative to the first supporting plate 10, the bolts 22 and the nuts 24. Upon this, the arm plate 14 which is constructed to be thinner than the first and second supporting plates 10 and 12 is deformed by the shaft portion 22a of the bolt 22 in a manner to expand the semicircular portion 14b, thereby dissipating energy of the shock load. With this; damages to the lock mechanism of the reclining device which has the first and second supporting plates 10 and 12, the planetary gears 20 and the control gear 18 are prevented or at least minimized, thereby assuring proper meshed conditions between the planetary gears 20 and the ring gears 10a and 12a and between the planetary gears 20 and the control gear 18. With this, the seatback is assuredly locked at a desired angular position.

It should be noted that, for example, the production cost of each supporting plate 10 or 12 which is formed with the ring gear 10a or 12a is usually much more expensive than that of the arm plate 14. Thus, the arm plate 14 which is broken by the load can be economically and easily replaced by a new one, as compared with the replacement of the supporting plate 10 or 12.

The position of the semicircular portion 14b of the arm plate 14 relative to the circular portion 14a is arbitrary and determined on the assumption of the most probable direction in which the shock load is applied to the reclining device. The semicircular portion 14b may take other shapes as long as it is smaller than the circular portion 14a in diameter.

Although it is not illustrated, it is optional to provide another energy-absorbing fastened structure. This structure comprises a base plate and the second supporting plate 12 which are fastened with each other through bolts and nuts. Similar to the above-mentioned arm plate 14, the base plate has a deformable portion. In this case, instead of the second supporting plate, the base plate is secured to the seat cushion.

It is optional to use rivets, instead of the bolts 22 and the nuts 24, to fasten the arm plate 14 and the first supporting plate 10 together.

It is optional to apply the energy-absorbing fastened structure to other types of the reclining device which do not have the planetary gear arrangement.

Furthermore, it should be noted that the energy-absorbing fastened structure according to the present invention is not limited to be applied to the reclining device. The fastened structure may be applied to other devices which have a possibility to receive a heavy shock load.

Energy-absorbing fastened structures according to second to fourth embodiments of the present invention are modifications of the fastened structure of the first embodiment. Parts substantially the same as those of the first embodiment are denoted by the same numerals and a detailed explanation of them will be omitted from the following description.

Figure 5:
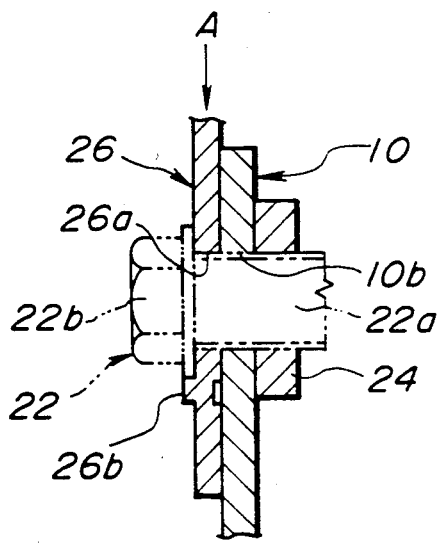
FIGS. 5 and 6 are views which are respectively similar to FIGS. 3 and 4, but showing a second embodiment of the present invention.
Figure 6:
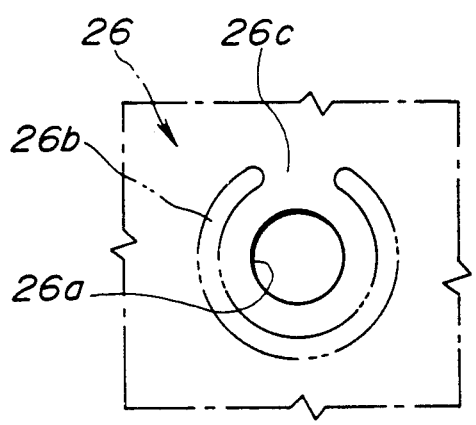

Referring to FIGS. 5 and 6, there is provided an energy-absorbing fastened structure according to the second embodiment of the present invention.

An arm plate 26 according to the second embodiment has circular through holes 26a (only one is shown) each of which is to be mated with the circular through hole 10b of the first supporting plate 10. The arm plate 26 is further formed at an annular periphery (no numeral) of the circular hole 26a with an arcuate boss portion 26b which projects toward the head portion 22b of the bolt 22 and which is made concentric with the circular hole 26a. Thus, when a heavy shock load exceeding a predetermined magnitude is applied to the reclining device in a downward direction which is shown by the arrow "A" in FIG. 5, the arm plate 26 is forced to move downwardly relative to the first supporting plate 10 and the bolts 22 and the nuts 24 so as to compressively deform the top portion 26c of the periphery.

Figure 7:
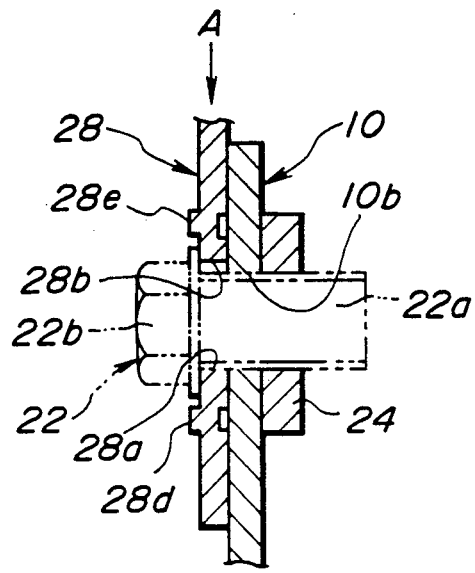
FIGS. 7 and 8 are views which are respectively similar to FIGS. 3 and 4, but showing a third embodiment of the present invention.
Figure 8:
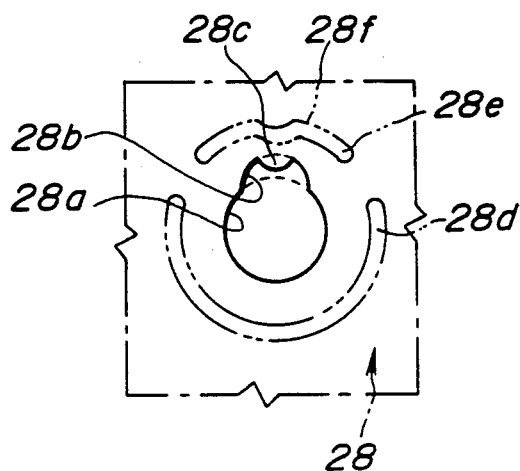

Referring to FIGS. 7 and 8, there is provided an energyabsorbing fastened structure according to a third embodiment of the present invention.

As is seen from FIG. 8, an arm plate 28 according to the third embodiment has through holes (only one is shown) each of which comprises a larger circular portion 28a and a smaller portion 28b. A generally semicircular projected portion 28c is formed on the arm plate 28 so as to extend toward the center of the larger circular portion 28a. The arm plate 28 is further formed at an annular periphery of the through hole, with a larger arcuate boss portion 28d which is concentric with the circular portion 28a, and with a smaller arcuate boss portion 28e which has a middle portion 28f thereof. This middle portion 28f is downwardly curved so as to conform to the peripheral shape of the semicircular projected portion 28c.

When a heavy shock load exceeding a predetermined magnitude is applied to the reclining device in a downward direction shown by the arrow "A" in FIG. 7, the arm plate 28 is forced to move downwardly relative to the first supporting plate 10 and the bolts 22 and the nuts 24. With this, the arm plate 28 is deformed by the shaft portion 22a of the bolt 22 in a manner to expand the smaller portion 28b of the through hole, thereby dissipating energy of the shock load. By provision of the semicircular projected portion 28c the arm plate 28 is not excessively deformed.

Figure 9:
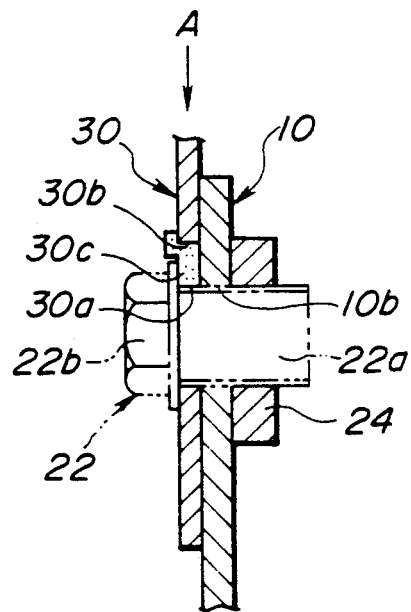
FIGS. 9 and 10 are views which are respectively similar to FIGS. 3 and 4, but showing a fourth embodiment of the present invention.
Figure 10:
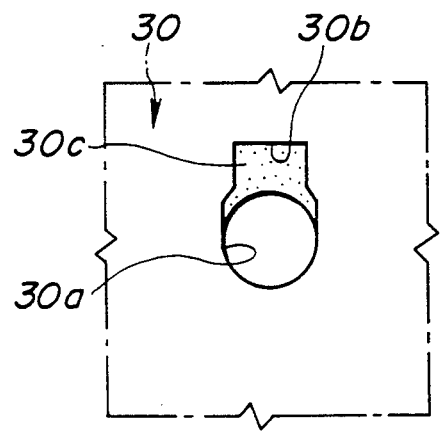

Referring to FIGS. 9 and 10, there is provided an energy-absorbing fastened structure according to the fourth embodiment of the present invention.

An arm plate 30 according to the fourth embodiment has a circular through hole 30a, and another through hole 30b to receive therein a resilient member 30c such as hard rubber.

When a heavy shock load exceeding a predetermined magnitude is applied to the reclining device in a downward direction shown by the arrow "A" in FIG. 9, the arm plate 30 is forced to move downwardly relative to the first supporting plate 10 and the bolts 22 and the nuts 24. With this, the resilient member 30c is elastically or plastically deformed, depending on the magnitude of the shock load, thereby dissipating energy of the shock load.

What is claimed is:

1. An energy-absorbing fastened structure comprising:
   a first member having a first circular through hole;
   a second member having a second circular through hole which is mated with the first circular through hole;
   a fastener, having a head portion and a shaft portion, for fastening the first and second members together, wherein the shaft portion of said fastener extends through the mated first and second circular through holes; and
   a first arcuate boss portion formed on the first member so as to be positioned at a periphery of the first circular through hole, the first arcuate boss portion being concentric with the first circular through hole and defining a flat portion between two open ends thereof on top of the first circular through hole for absorbing an energy of a load which exceeds a predetermined magnitude and is applied to the fastened structure, the flat portion of the first member being constructed so as to be deformed by the shaft portion of the fastener which is forced to move together with the second member relative to the first member;
   said first arcuate boss portion having an inner arcuate surface which is in direct abutment with the head portion of said fastener such that the head portion is substantially encircled by said first arcuate boss portion.

2. An energy-absorbing fastened structure according to claim 1, wherein said fastener comprises a bolt and a nut which is screwed onto the bolt, for fastening the first and second members together.

3. An energy-absorbing fastened structure according to claim 2, wherein said first member is disposed on the side of a head portion of the bolt, and wherein said second member is disposed on the side of the nut.

4. An energy-absorbing fastened structure according to claim 1, wherein the first and second through holes are sized so as to fitly receive the shaft portion of said fastener without producing play therebetween.

5. An energy-absorbing fastened structure according to claim 1, wherein said first and second members are platelike in shape, and wherein said second member is thicker and thus more strongly built than said first member is.

6. An energy-absorbing fastened structure according to claim 1, wherein the head portion of said fastener includes a washer which is in direct abutment with and is substantially encircled by said first arcuate boss portion.

* * * * *